United States Patent [19]
Harada et al.

[11] Patent Number: 5,559,160
[45] Date of Patent: Sep. 24, 1996

[54] LIQUID ABSORBABLE MATERIAL AND METHOD FOR PRODUCTION THEREOF

[75] Inventors: Nobuyuki Harada, Osaka; Katsuyuki Wada, Hyogo; Hisanori Obara, Hyogo; Toru Inaoka, Hyogo, all of Japan

[73] Assignee: Nippon Shokubai Co., Ltd., Osaka, Japan

[21] Appl. No.: 234,416

[22] Filed: Apr. 28, 1994

[30] Foreign Application Priority Data

Apr. 28, 1993 [JP] Japan ..................... 5-102138
Jul. 30, 1993 [JP] Japan ..................... 5-190205

[51] Int. Cl.$^6$ .......................................... C08J 9/28
[52] U.S. Cl. .................................. 521/64; 521/64
[58] Field of Search ............................. 521/61, 64

[56] References Cited

U.S. PATENT DOCUMENTS

| | | | |
|---|---|---|---|
| 4,522,953 | 6/1985 | Barby et al. | 521/64 |
| 4,611,014 | 9/1986 | Jomes et al. | 521/146 |
| 4,612,334 | 9/1986 | Jones et al. | 521/146 |

FOREIGN PATENT DOCUMENTS

| | | |
|---|---|---|
| 0239360 | 9/1987 | European Pat. Off. . |
| 47-29479 | 11/1972 | Japan . |
| 48-94785 | 12/1973 | Japan . |
| 1380044 | 1/1975 | United Kingdom . |
| 1458203 | 12/1976 | United Kingdom . |

*Primary Examiner*—Morton Foelak
*Attorney, Agent, or Firm*—Burns, Doane, Swecker & Mathis, L.L.P.

[57] ABSTRACT

The disclosure is a liquid absorbable material comprising a porous formed article possessed of partitioning walls of a cross-linked polymer and continued micropores, characterized in that said material has a density in the range of 0.2 to 1.0 g/cm$^3$, and (a) that said partitioning walls exhibit a swelling degree to kerosine in the range of 2 to 10, and that said material has an absorption capacity per unit volume, the capacity being at least 4 cm$^3$/cm$^3$ for water, ethanol, toluene and kerosine, respectively, or (b) that said material has an absorption capacity per unit weight, the capacity being at least 10 g/g for water, ethanol, toluene and kerosine, respectively, the liquids being at a temperature not less than the softening point of the cross-linked polymer. The liquid absorbable material can absorb liquids such as water and petroleum quickly and expand with the absorbed liquid.

6 Claims, No Drawings

LIQUID ABSORBABLE MATERIAL AND METHOD FOR PRODUCTION THEREOF

TECHNICAL FIELD

This invention relates to a novel liquid absorbable material and a method for the production of the liquid absorbable material. More particularly, it relates to a compact liquid absorbable material which, on contact with a liquid such as water, alcohol, or petroleum, quickly absorbs the liquid therein and expands and does not easily release the absorbed liquid even under load and a method for the production of this liquid absorbable material.

BACKGROUND OF THE ART

As a sparingly inflammable formed article of a porous cross-linked polymer containing a large volume of water, the cured article of a water-in-oil type emulsion containing up to 90% of an inner water phase has been known (British Patent No. 1,458,203, JP-A-47-29,479, and JP-A-48-94,785).

As an application of this water-in-oil type emulsion, JP-A-57-198,713 discloses a low-density porous polymer. This polymer is known to be capable of absorbing such a hydrophobic liquid as oil in the pores thereof. JP- A-60-217,204 and JP-A-60-217,205 disclose low-density modified polystyrene porous cross-linked polymers having a density of less than 0.2 g/cm$^3$. These polymers are known to be capable of absorbing oil and water in the pores thereof, depending on the degree of modification. Besides, JP-A-62-250,002 discloses a knowledge that a low-density porous cross-linked polymer possessing elasticity is obtained by polymerizing an emulsion of a corresponding monomer while controlling the diameter of discontinuous phase liquid drops in the emulsion within a specific range.

The polymers which are disclosed in the aforementioned publications known to the prior art, however, are low-density porous polymers and contain a large volume of air in the pores which are distributed throughout their whole volume. To absorb a liquid, therefore, they require to exchange the large volume of air contained therein for the liquid. Owing to this exchange, they do not manifest any ability to absorb the liquid quickly. Further, these polymers suffer their pores to grow-in diameter while they are in the process of retaining the absorbed liquid in the pores, they readily release the absorbed liquid when they are exposed to pressure. Thus, these polymers exhibit only a poor liquid retaining power under load.

The elastic porous cross-linked polymer which is disclosed in JP-A-62-250,002 has a large pore diameter and a large porosity and assumes a spongy texture under normal conditions. If it is elected to be used as a liquid absorbable material, it will fail the service required of the liquid absorbable material unless it is improved in its own wettability with a liquid to be absorbed. It further manifests only an insufficient liquid retaining power under load and betrays deficiency in the liquid absorbing property. If the porous polymer in such a spongy texture as described above is mechanically compressed and converted into a formed article compact under normal conditions, it is no longer capable of absorbing liquid because the pores therein succumb to fracture under load of the mechanical compression. A porous polymer is generally such that when it gains in density, it is normally assumed to undergo compaction of the kind required of a liquid absorbable material. None of the liquid absorbable materials heretofore introduced to the art proves capable of absorbing a varying kind of liquid quickly at a high ratio of expansion on contact therewith.

Thus, the appearance of a compact liquid absorbable material which, on contact with a liquid such as water, alcohol, or petroleum, quickly absorbs the liquid into the interior thereof and expands with the absorbed liquid has been earnestly desired.

The present invention is aimed at fulfilling this desire. An object of this invention, therefore, is to provide a novel liquid absorbable material which is compact in a dry state and which, on contact with a liquid such as water, alcohol, or petroleum, quickly absorbs the liquid in the interior thereof and expands with the absorbed liquid. Another object of the present invention is to provide a method for attaining the production of this liquid absorbable material easily and conveniently.

DISCLOSURE OF THE INVENTION

The objects mentioned above are accomplished by a liquid absorbable material which is made of a porous formed article having partitioning walls of a cross-linked polymer and continuous micropores, and characterized in that the material has a density in the range of 0.2 to 1.0 g/cm$^3$, that the partitioning walls exhibit a-swelling degree to kerosine in the range of 2 to 10, and that the material has an absorption capacity per unit volume, the capacity being at least 4 cm$^3$/cm$^3$ for water, ethanol, toluene and kerosine, respectively.

The objects mentioned above are further accomplished by a liquid absorbable material which is made of a porous formed article having partitioning walls of a cross-linked polymer and continuous micropores and characterized in that the material has a density in the rage of 0.2 to 1.0 g/cm3, and that the material has an absorption capacity per unit weight, the capacity being at least 10g/g for water, ethanol, toluene and kerosine, respectively, wherein the liquids being at a temperature not less than the softening point of the cross-linked polymer.

This invention further contemplates the liquid absorbable material, wherein the cross-linked polymer has a glass transition temperature in the range of –30° to 90° C. This invention also contemplates the liquid absorbable material, wherein the liquid absorbable material has a density in the range of 0.3 to 0.98 g/cm$^3$. This invention also contemplates the liquid absorbable material, wherein the material has a volume of at least 0.2 cm$^3$. This invention also contemplates the liquid absorbable material wherein the porous formed article exhibits a ratio of retention of not less than 30% to a physiological saline solution under load. This invention also contemplates the liquid absorbable material, wherein the cross-linked polymer is what is produced by causing a monomer possessing one polymerizing unsaturated group in the molecular unit thereof to react with a cross-linking monomer possessing at least two polymerizable unsaturated groups in the molecular unit thereof.

The objects mentioned above are accomplished by the present invention providing a method for the production of a liquid absorbable material of a porous formed article, characterized by the steps of mixing 1 to 20% by weight of a monomer ingredient comprising a monomer possessing one polymerizable unsaturated group in the molecular unit thereof and a cross-linkable monomer possessing at least two polymerizable unsaturated groups in the molecular unit thereof and 99 to 80% by weight of water in the presence of 1 to 40% by weight, based on 100 parts by weight of the monomer ingredient, of an oil-soluble surfactant thereby forming a water-in-oil type emulsion possessing a large volume of water as an inner discontinuous phase, then thermally polymerizing the emulsion at a temperature in the range of 25° to 90° C. in the presence of a polymerization initiator thereby forming a porous cross-linked polymer, and further compression molding the porous cross-linked polymer to a density in the range of 0.2 to 1.0 g/cm$^3$.

The present invention further contemplates the method of production mentioned above, wherein the compression molding are performed at a temperature of not less than the softening point of the cross-linked polymer.

The present invention further contemplates the method of production mentioned above, wherein the cross-linked polymer has a glass transition temperature in the range of –30° to 90° C. This invention also contemplates the method of production, wherein the porous cross-linked polymer is a hydrate possessing micropores of an average pore diameter in the range of 1 to 10µm and the porous formed article is obtained by dewatering the hydrate by dint of pressure and then drying the dewatered hydrate. This invention contemplates the method, wherein the crosslinkable monomer possessing at least two polymerizing unsaturated groups in the molecular unit thereof accounts for a proportion in the range of 1 to 50% by weight to the whole monomer component. This invention contemplates the method, wherein the monomer possessing one polymerizable unsaturated group in the molecular unit thereof contains at least 50% by weight of an alkyl (meth)acrylate having an alkyl group of 1 to 20 carbon atoms.

BEST MODE FOR CARRYING OUT THE INVENTION

The liquid absorbable material of this invention comprises a porous formed article and, therefore, contains myriads of pores through which such a liquid as water, alcohol, or petroleum, while in the process of being absorbed by the formed article, permeates the interior of the formed article. These pores are formed with partitioning walls of the cross-linked polymer. They are so constructed that they will not be perfectly partitioned from one another but will be continued to permit flow of the liquid between the adjacent pores.

As a result, the liquid absorbable material enjoys a prominent speed of liquid absorption on the order of seconds as compared with the conventional self-swelling type oil absorbable and water absorbable resin whose speeds of oil or water absorption are on the order of minutes at best. Further, since the partitioning walls of cross-linked polymer expand themselves on contact with a liquid, the liquid absorbable material of this invention manifests a heretofore unattainable preeminent liquid absorbable characteristic as evinced by quick absorption of liquid and consequent voluminal expansion and fast retention of the absorbed liquid. Besides, since the liquid absorbable material of this invention is capable of absorbing various kinds of liquid such as water, alcohol, and petroleum and expanding itself with the absorbed liquid, it possesses such characteristic features as are absent in liquid absorbable materials which are capable of absorbing only a specific liquid such as water or petroleum.

This invention has originated in a new knowledge that a porous formed article in which pores defined by partitioning walls as described above retain their continued state and sustain virtually no fracture in spite of the impact of the compression molding utilized for the manufacture of the porous formed article is never obtained unless a porous cross-linked polymer destined to form the partitioning walls has been synthesized by a method which uses specific conditions peculiar to this invention. When the porous cross-linked polymer having micropores of diameters falling in the smallest possible range and averaging not more than 10µm undergoes a process of compression molding, it can produce a compact liquid absorbable material which can keep the compressed state intact after it has been dried and, on contact with a liquid, can quickly absorb the liquid and expand itself and retain the absorbed liquid fast. Further, since the liquid absorbable material of this invention can be formed in a desired shape without crushing or breaking the continued pores allowing flow of a liquid, it can be utilized in various applications without loss of its own liquid absorbable characteristic.

As typical examples of the alkyl (meth)acrylate which forms the main component of the monomer (A) having one polymerizing unsaturated group in the molecular unit thereof to be used in this invention, alkyl (meth)acrylates having alkyl groups of 1 to 20 carbon atoms such as methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, hexyl (meth)acrylate, heptyl (meth)acrylate, 2-ethylhexyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate otherwise called stearyl (meth)acrylate, nonadecyl (meth)acrylate, and eicosyl (meth)acrylate may be cited. These alkyl (meth)acrylates can be used either singly or in the form of a mixture of two or more members. Among other alkyl (meth)acrylates cited above, those alkyl (meth)acrylates having alkyl groups of 12 to 20 carbon atoms prove particularly preferable because they are capable of producing a porous formed article exhibiting a balanced liquid absorbing ability to various liquids. At least one selected from the group consisting dodecyl (meth)acrylate, tetradecyl (meth)acrylate and stearyl (meth)acrylate prove particularly preferable.

In this invention, the alkyl (meth)acrylate mentioned above must be used as a main component of the monomer (A) having one polymerizable unsaturated group in the molecular unit thereof and, therefore, must be used in an amount of not less than 50% by weight, preferably not less than 70% by weight. If the amount of the alkyl (meth)acrylate to be used in the monomer (A) is less than 50% by weight, the produced liquid absorbable material will be deficient in liquid absorbable properties, particularly the speed of liquid absorption or the capacity for absorbing water or highly viscous oil, and will entail the possibility of the continued pores being fractured under the impact of compression molding.

In the present invention, the monomer (A) may contain in a proportion of not more than 50% by weight other monomer having one polymerizable unsaturated group in the molecular unit thereof and exhibiting copolymerizability to the alkyl (meth)acrylate mentioned above. As typical examples of this monomer, unsaturated carboxylic esters such as phenyl (meth)acrylate, octyl phenyl (meth)acrylate, nonyl phenyl (meth)acrylate, dinonyl phenyl (meth)acrylate, dibutyl maleate, didodecyl maleate, dodecyl crotonate, didodecyl itaconate, 2-hydroxyethyl (meth)acylate, didodecyl itaconate, and 2-hydroxyethyl (meth)acrylate; (meth)acryl amides such as (meth)acryl amide, (di)isopropyl (meth)acryl amide, (di)butyl (meth)acryl amide, (di)dodecyl (meth)acryl amide, (di)stearyl (meth)acryl amide, (di)butyl phenyl (meth)acryl amide, and (di)octyl phenyl (meth)acryl amide; α-olefins such as butadiene, isoprene, 1-hexene, 1-octene, iso-octene, 1-nonene, 1-decene, and 1-dodecene; alicyclic vinyl compounds such as vinyl cyclohexene; allyl ethers such as dodecyl allyl ether; vinyl esters such as vinyl acetate, vinyl caproate, vinyl laurate, and vinyl stearate; vinyl ethers such as butyl vinyl ether and dodecyl vinyl ether; aromatic vinyl compounds such as styrene, t-butyl styrene, and octyl styrene; and (meth)acrylic acid, maleic acid or anhydride, itaconic acid, and (meth)acrylonitrile may be cited. These monomers may be used either singly or in the form of a mixture of two or more members.

As typical examples of the cross-linkable monomer (B) possessing at least two polymerizable unsaturated groups in the molecular unit thereof and used for this invention, ethyleneglycol di(meth)acrylate, diethyleneglycol di(meth)acrylate, polyethyleneglycol di(meth)acrylate, polyethyleneglycol polypropyleneglycol di(meth)acrylate, propyleneglycol di(meth)acrylate, polypropyleneglycol di(meth)acrylate, 1,3-butyleneglycol di(meth)acrylate, neopentylglycol di(meth)acrylate, 1,6-hexanediol di(meth)acrylate, N,N'-methylene-bis-acrylamide, N,N'- propylene-bis-acrylamide, glycerin tri(meth)acrylate, trimethylolpropane tri(meth)acrylate, tetramethylolmethane tetra(meth)acrylate, polyfunctional (meth)acrylates obtained by the esterification of alkylene oxide adduct of polyhydric alcohol (such as, for example, glycerin, trimethylol propane, or ether methylol methane) with (meth)acrylic acid, and divinyl benzene may be cited. These cross-linking monomers may be used either singly or in the form of a mixture of two or more members. Among other monomers (B) cited above, polyfunctional (meth)acrylates such as trimethylolpropane tri(meth)acrylate prove particularly suitable for use in the present invention.

The proportion of the cross-linkable monomer (B) containing at least two polymerizable unsaturated groups in the molecular unit thereof to be used in this invention to the whole monomer component is in the range of 1 to 50% by weight, preferably 5 to 45% by weight, and more preferably 10 to 40% by weight, based on the amount of the whole monomer component. If the amount of the monomer (B) to be used is less than 1% by weight, the produced liquid absorbable material will not manifest the liquid absorbable property sufficiently because the cross-linked polymer acquires viscosity so high as to render difficult the manufacture of a porous formed article possessing continued pores and the cross-linked polymer itself becomes readily soluble on contact with a liquid. If this amount exceeds 50% by weight, the produced liquid absorbable material will have no sufficient capacity for liquid absorption per unit volume or unit weight.

As typical examples of the oil-soluble surfactant to be used in the present invention, sorbitan derivatives such as sorbitan monolaurate, sorbitan monopalmitate, sorbitan monostearate, sorbitan distearate, sorbitan tristearate, sorbitan monooleate, sorbitan trioleate, and sorbitan sesquioleate; glycerol derivatives such as glycerol monostearate and glycerol monooleate; polyoxyethylene fatty acid esters such as polyoxyethylene lauryl ether; and metal soaps such as magnesium stearate and calcium stearate may be cited. Among other oil-soluble surfactants cited above, nonionic surfactants having HLB in the approximate range of 2 to 9 prove particularly preferable. These oil-soluble surfactants are used either singly or, for the sake of improving the speed of liquid absorption, in the form of a mixture of two or more members. The amount of the surfactant to be used is in the range of 1 to 40 parts by weight, preferably 5 to 30 parts by weight, based on 100 parts by weight of the monomer ingredient. If this amount of the surfactant is less than 1 part by weight, the water-in-oil type emulsion will be deficient in stability. If the amount exceeds 40 parts by weight, the excess surfactant will bring about no proportionate addition to the effect of the surfactant.

The present invention permits incorporation of various stabilizers besides the surfactant mentioned above for the sake of stabilizing the water-in-oil type emulsion in the course of polymerization. The stabilizers which are preferable for this invention are water-soluble inorganic salts. Such a stabilizer is preferable to be added in advance to the water phase. As typical examples of the water-soluble inorganic salt suitable for use herein, water-soluble salts of calcium, sodium, potassium, magnesium, and aluminum may be cited. Among other water-soluble inorganic metals mentioned above, polyvalent metal salts prove particularly preferable. The amount of such a water-soluble inorganic salt to be added is preferable to be in the range of 0.1 to 20 parts by weight, preferably 0.3 to 10 parts by weight, based on 100 parts by weight of water.

Any of the radical generating agents known in the art may be used as a polymerization initiator in this invention. The polymerization initiators which are effectively usable herein include monomer-soluble organic peroxides such as benzoyl peroxide, lauroyl peroxide, and cumene hydroperoxide; monomer-soluble azo compounds such as 2,2'-azo-bis-isobutylonitrile, and 2,2'-azo-bis-dimethylvaleronitrile; water-soluble persulfates such as potassium persulfate, sodium persulfate, and ammonium persulfate; and water-soluble azo compounds such as 2,2'- azo-bis(N,N-dimethylene isobutyl amidine) dihydrochloride and 2,2'-azo-bis(2-amidinopropane) dihydrochloride, for example. These polymerization initiators may be used either singly or in the form of a mixture of two or more members. It is further permissible to use the polymerization initiator in combination with such a reducing agent as sodium thiosulfate or sodium sulfite and enable it to function as a redox polymerization catalyst. The polymerization initiator is used as mixed with the monomer or with water. The amount of the polymerization initiator to be used is desired to be in the range of 0.05 to 5% by weight, preferably 0.1 to 3 % by weight, based on the amount of the monomer ingredient.

For the production of the liquid absorbable material of a porous formed article contemplated by this invention, it is necessary first to mix 1 to 20% by weight of the monomer ingredient consisting of the monomer (A) and the monomer (B) mentioned above with 99 to 80% by weight of water in the presence of I to 40 parts by weight of an oil-soluble surfactant based on 100 parts by weight of the monomer ingredient to give rise to a water-in-oil type emulsion possessing a large volume of water as an inner discontinuous phase. The mixing ratio of the monomer ingredient and water must be in a range such that the proportion of the monomer ingredient falls in the range of 1 to 20% by weight and that of water in the range of 99 to 80% by weight, preferably in a range such that the proportion of the monomer ingredient falls in the range of 1 to 15% by weight and that of water in the range of 99 to 85% by weight. If the amount of the monomer ingredient is less than 1% by weight, the produced porous formed article will be deficient in strength and the liquid absorbable material will permit no easy handling. If this amount exceeds 20% by weight, the produced liquid absorbable material will have no sufficient capacity for liquid absorption.

This invention is not very particular about the kind of a method to be adopted for the formation of the water-in-oil type emulsion by the mixture of the monomer ingredient with water in the presence of an oil-soluble surfactant. It only requires the adopted method to be capable of forming a water-in-oil type emulsion which possesses a large volume of water in the form of an inner discontinuous phase. For example, 1) a method which comprises adding to water kept in a stirred state the monomer ingredient having the surfactant dissolved in advance therein, 2) a method which comprises adding water kept in a stirred state to the monomer component having the surfactant dissolved in advance therein, 3) a method which comprises adding water to the monomer ingredient having the surfactant dissolved in advance therein and subsequently stirring the resultant mixture, 4) a method which comprises adding to water the monomer ingredient having the surfactant dissolved in advance therein and subsequently stirring the resultant mixture, and 5) a method which comprises continuously feeding a given vessel simultaneously with the monomer having the surfactant dissolved in advance therein and water and meanwhile stirring the resultant mixture may be cited. In each of these methods, the surfactant may be preparatorily dissolved in the monomer ingredient as described above. Otherwise, it may be preparatorily dispersed in water. Alternatively, the monomer ingredient, water, and the surfactant may be separately supplied to the prospective site of mixture and stirred collectively thereat. Among other methods cited above, the method which comprises having the surfactant dissolved preparatorily in the monomer ingredient proves desirable from the economic point of view.

For the purpose of mixing or stirring the ingredients in the formation of the water-in-oil type emulsion according to this invention, various known devices are available. For example, tank type stirring devices furnished with various stirring blades, static mixers, kneaders, and homogenizers may be cited.

By the method of the present invention, the water-in-oil type emulsion formed by the procedure mentioned above is thermally polymerized in the presence of a polymerization initiator at a temperature in the range of 25° to 90° C. in order to obtain a porous cross-linked polymer (I). In preparation for the thermal polymerization, the water-in-oil type emulsion is preferable to be left at rest for polymerizing under conditions such as to induce no destruction of the inner water phase of the emulsion. For example, the water-in-oil type emulsion may be subjected to cast polymerization in the batchwise or continuous feeding operation. By giving a desired shape to the vessel to be used for the polymerization, the porous cross-linked polymer (I) can be obtained by the polymerization in a desired shape such as, for example, granules, fibers, a mat, a sheet, or a block. By forming each piece of liquid absorbable material so as to have a volume of at least 0.2 $cm^3$, the obtained liquid absorbable material enjoys easy handling. Of course, a method of continuous polymerization may be adopted for the purpose of this polymerization. The polymerization temperature is in the range of 25° to 90° C., preferably 40° to 80° C. It is permissible to carry out the first half stage of the polymerization at a temperature in the range of 25° to 50° C. and the latter half stage thereof at a temperature in the range of 50° to 90° C. In this case, it is preferable to use initiators having different half-life periods simultaneously. Preferably, the polymerization time is selected in the approximate rate of 1 to 30 hours. If the polymerization temperature is less than 25° C., the polymerization consumes a long time such as to render the operation itself uncommercial. If this temperature exceeds 90° C., the porous cross-linked polymer (I) to be obtained acquires a controlled pore diameter only with difficulty and the liquid absorbable material to be eventually produced has an insufficient capacity for liquid absorption.

The important thing about this invention is that the porous cross-linked polymer (I) obtained as described above has micropores having an average pore diameter in the range of 1 to 10μm and that when this porous cross-linked polymer (I) in the hydrous state is compressed in the direction of thickness to be dewatered, then optionally given a drying treatment, and converted into a porous formed article having a density in the range of 0.2 to 1 $g/cm^3$, preferably 0.3 to 0.98 g/cm3, it gives rise to a compact liquid absorbable material having an absorption capacity per unit volume which is at least 4 $cm^3/cm^3$, preferably 5 to 30 $cm^3/cm^3$ for water, ethanol, toluene and kerosine, respectively. The liquid absorbable material of this invention can be easily made by the optimization of production conditions to acquire an absorption capacity per unit weight being at least 10 g/g for water, ethanol, toluene and kerosine, respectively, or an absorption capacity for olive oil of at least 10 g/g, or an ability to retain not less than 30% of physiological saline solution under load. The fact that the liquid absorbable material possesses these liquid absorption properties is also important for this invention.

In this invention, water-insoluble or water-saturable organic or inorganic hydrophilic particles may be dispersed in the water phase in advance of the polymerization for the purpose of augmenting the speed of liquid absorption. Ideal hydrophilic particles for use in this case include such silicon dioxide preparations as are marketed under trademark designations of "Aerosil 200" (product of Nippon Aerosil Co. Ltd.) and "Siloid 63" (product of Fuji Debison Co. Ltd.), for example.

The porous cross-linked polymer (I) of this invention is preferable to have an average pore diameter in the range of 1 to 10μm, preferably 2 to 8 μm. Suitable selection of the composition of the monomer ingredient, the mixing and stirring conditions during the formation of the emulsion, the temperature conditions during the polymerization, etc. suffices the control of this average pore diameter in the present invention.

If the average pore diameter of the porous crosslinked polymer (I) is larger than 10μm, this invention entails the disadvantage that the compression molding does not proceed enough to allow easy production of a compact liquid absorbable material and the produced liquid absorbable material is deficient in capacity for liquid absorption or in ratio of liquid retention under load. Incidentally, the average pore diameter of the porous cross-linked polymer (I) of this invention is determined by washing a given porous cross-linked polymer (I) obtained in a hydrous state by polymerization with a large volume of acetone, then drying the washed polymer to prepare a sample, subjecting the cross section of the sample to image analysis with the aid of an electron microscope thereby obtaining a histogram which represents void size distribution of the sample, and calculating the average pore diameter by way of number average. When the average pore diameter is less than 1μm, the porous cross-linked polymer (I), on being compression molded, produces a porous formed article which is effectively usable as a liquid absorbable material of this invention. The density of the porous formed article must be in the range of 0.2 to 1 $g/cm^3$, preferably 0.3 to 0.8 $g/cm^3$. If the density of the porous formed article is less than 0.2 $g/cm^3$, the porous formed article exhibits an inferior capacity for liquid absorption and an unduly low ratio of liquid retention under load and tends to let loose the liquid previously absorbed. Conversely, if the density exceeds 1 g/cm$^3$, the porous formed article has difficulty in keeping continued pores intact and demands a sacrifice of the speed of liquid absorption and, while in use afloat on a liquid as for the disposal of oil astray on a coastal water, suffers much from inconveniences.

The method to be adopted for the compression molding has no particular restriction except for the sole requirement that it should be capable of compression molding the porous cross-linked polymer (I) while enabling the micropores of the polymer to retain their continued state and inducing no destruction of the continued state of the micropores. For example, a method for compression molding the porous cross-linked polymer (I) as by passing this polymer between two opposed rolls may be adopted. For the sake of preventing the work of compression molding from inducing fracture of these micropores, the molding temperature during the compression molding is preferable to exceed the softening point of the porous cross-linked polymer, preferably to be at least 10° C. higher than the glass transition temperature (Tg) of the porous cross-linked polymer.

The porous molded article obtained by the compression molding as described above has continued pores which are defined by partitioning walls of a cross-linked polymer. Part of these pores remain in the form of empty voids and part of the pores are filled with water. The porous formed article containing these pores can be used in its unaltered form as a liquid absorbable material of the present invention. The porous formed article which has part of the pores thereof filled with water is preferable to be dried so that it may be used as a liquid absorbable material enjoying exalted ease of handling. Generally, the drying temperature is in the range of 50° to 150° C., preferably 50° to 90° C., and the drying time in the range of 1 to 30 hours. Where the liquid absorbable material is to be used for the absorption of an oily liquid incapable of intimating mixing with water or when it is desired to be used in a dry state as in the case of a disposable diaper, it is advantageous to adopt for the liquid absorbable material the porous formed article which has been dried in advance.

The glass transition temperature of the cross-linked polymer of this invention is desired to be in the range of –30° to 90° C., preferably –25° to 60° C.

An astounding feature of this invention resides in the fact that only when the swelling degree which the partitioning walls of the porous formed article exhibits to kerosene and the density of the porous formed article both fall in respectively specific ranges, the porous formed article can serve as a liquid absorbable material which is capable of effectively absorbing all sorts of liquids such as water, alcohol, and petroleum and consequently swelling with the absorbed liquid.

For the present invention, the range of the swelling degree exhibited by the partitioning walls to kerosene is critically important. The term "swelling degree" as used herein means the proportion of the weight of the crosslinked polymer forming the partitioning walls of the porous formed article in the state of absorbing kerosene to the weight of the cross-linked polymer in the dried state. In this case, the amount of kerosene absorbed within the pores of the porous formed article is not reckoned in the capacity of the cross-linked polymer for liquid absorption. The swelling degree which the cross-linked polymer of this invention exhibits to kerosene, therefore, is found by immersing an accurately weighed sample of the cross-linked polymer in kerosene, allowing the sample to be swelled thoroughly with kerosene. (Tokyo Kasei Co., Ltd. catalogue's No. 113-00066), removing from the swelled sample the excess kerosene entrapped in the pores by suction filtration, and calculating the quotient of the weight of the swelled sample after the filtration divided by the weight of the sample before the swelling. The sample of cross-linked polymer to be used for the determination of the swelling degree has a weight of about 0.05 g. The immersing time is set at one minute and the suction filtration time at 30 seconds.

This invention requires to set the swelling degree exhibited by the partitioning walls of the porous formed article to kerosene in the range of 2 to 10, preferably 2 to 8. If the swelling degree deviates from the range mentioned above, the liquid absorbable material no longer manifests the peculiar property of quickly absorbing a liquid and consequently swelling with the absorbed liquid. If the swelling degree is less than 2, the porous formed article to be obtained has the disadvantage of acquiring only an unduly small capacity for liquid absorption per unit volume. Conversely, if the swelling degree exceeds 10, the porous formed article has the disadvantage that the partitioning walls have unduly low strength, the continued pores are produced in the porous formed article only with difficulty, and the capacity of the liquid absorbable material for absorbing water or alcohol is unduly small per unit volume.

The porous formed article to be used as a liquid absorbable material of this invention has a absorption capacity of at least 4 cm$^3$, preferably 5 to 30cm$^3$ per unit volume cm$^3$ with respect to water ethanol, toluene and kerosine. None of the liquid absorbable materials heretofore known to the art is capable of absorbing at least 4 cm$^3$ of a varying liquid per cm$^3$ and swelling with the absorbed liquid. For example, water absorbable resins such as cross-linked polymer of sodium polyacrylate which absorb a large volume of an aqueous liquid such as water are incapable of absorbing an oily liquid and swelling with the absorbed oily liquid and self-swelling type oil absorbable resins such as cross-linked alkyl (meth)acrylates are incapable of absorbing an aqueous liquid or ethanol. Then, absorbent paper and non-woven fabric of polypropylene only retain a liquid in their voids and their capacities for liquid absorption are not more than 1 cm$^3$ per cm$^3$. The capacity for liquid absorption per unit volume which is contemplated by this invention is determined by the method which is defined below.

The porous formed article to be used as the liquid absorbable material of this invention has an absorption capacity which indicates at least 10 g, preferably 15 to 50 g, per unit weight with respect to water, kerosene and toluene at a temperature of not less than the softening point of the cross-linked polymer, as well as that for ethanol. The reasons for absorbing the former liquids are also similar to that for absorbing the latter ethanol. Further, it has a retention ratio to water under pressure of 30 to 100%, more preferably 60 to 100%.

The liquid absorbable material of this invention obtained as described above may be freely shaped as by cutting to a desired shape such as, for example, sheet, block, fibers, film, or grains. This liquid absorbable material preeminently excels in the speed of liquid absorption because it is formed of a porous formed article containing myriads of continued pores through which such a liquid as water, alcohol, or petroleum permeates the interior of the formed article when the article contacts the liquid. Moreover, it is capable of retaining the absorbed liquid fast even under load.

The porous formed article of this invention can be used in its unaltered form as a liquid absorbable material. It may be inserted tightly between two opposed sheets of film at least part of which is pervious to liquid or packed in a container made of a substance pervious to liquid so as to be used as a liquid absorbable product.

Now, this invention will be described in detail below with reference to the working examples which are cited for the sake of-illustrating and not limiting the invention. Wherever the term "parts" is mentioned in the working examples, it shall be construed as indicating "parts by weight" unless otherwise specified.

The capacity per unit weight or unit volume of a liquid absorbable material of the present invention for absorbing a varying liquid and the ratio at which the liquid absorbable material retains absorbed water fast under load are respectively determined by the following methods.

(Capacity for liquid absorption per unit volume)

In advance of the determination for the capacity, a given porous article as the liquid absorbable material was measured in size in order to determine the volume $V_1$ (cm$^3$) before absorption thereof. Then, the porous article was immersed in an ample volume of water, ethanol, toluene or kerosine, and left standing therein until it did not absorb the liquid and expand anymore, namely, it absorbed the liquid to saturation, which is determined by plotting at every unit time the state of the porous article absorbing the liquid and expanding with the absorbed liquid. The porous article which had absorbed the liquid and swelled with the absorbed liquid was measured in size under no load condition, and the measured size was regarded as the volume $V_2$ (cm$^3$) after absorption. The volume after absorption $V_2$ divided by the volume before absorption $V_1$ gives the capacity (cm$^3$/cm$^3$) of the liquid absorbable material for absorbing the liquid.

(Capacity for liquid absorption per unit weight)

A dry square sample cut from a given liquid absorbable material in a size, about 2 mm in thickness and 1 cm in length of the side of the square area, and weighed in advance was immersed in an ample volume of a given liquid, and left standing therein until it absorbed the liquid to saturation, with the time spent for this standing clocked and recorded. The sample which had absorbed the liquid and swelled with the absorbed liquid was left standing for the sake of draining on a glass filter (#0: produced by Duran Corp.) of 120 mm in diameter and 5 mm in height for 30 seconds. Then the sample still retaining the absorbed liquid was weighed. The capacity (g/g) of the liquid absorbable material for absorbing the liquid was calculated in accordance with the following formula.

Capacity for absorption =

(Weight of sample after absorption − Weight of sample before absorption)/(Weight of sample before absorption)

(Ratio of retention of absorbed physiological saline solution under load)

The wet sample which had undergone the determination of the capacity for absorbing physiological saline solution, i.e. 0.9 wt % of saline (capacity for liquid absorption before exertion of load) was placed on the same glass fiber as used for the determination of the capacity for absorption per unit weight and kept standing thereon at 25° C. under load of 20 g/square centimeter for 15 minutes. The capacity for absorption (g/g) after exertion of the load was found by substituting the weight of the sample after the exertion of the load for the weight of the sample after the absorption in the formula for the calculation of the capacity for absorption and then the ratio (%) of retaining physiological saline solution under load was found in accordance with the following formula.

Ratio (%) of retention of physiological saline solution under load =
(Capacity for absorption after exertion of pressure/

Capacity for absorption before exertion of pressure) × 100

EXAMPLE 1

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of stearyl methacrylate, 4 g of trimethylol propane trimethacrylate, and 6 g of sorbitan monooleate (marketed under trademark designation of "Span 80" and product of Kao Corp.) was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 10 hours with the inner temperature of the vessel kept at 65° to 75° C., to obtain a hydrous porous cross-linked polymer (I-1). This polymer was found to have an average pore diameter of 9μm. This polymer was washed with hot water at 75° C and sliced in the hydrous state into pieces 10 mm in thickness. The piece was interposed between two perforated plates, compressed there between in the direction of thickness to be dewatered, and then dried in a hot air drier at 60° C for 10 hours to obtain a liquid absorbable material (1) of this invention made of a porous formed article having a density of 0.39 g/cm$^3$.

The liquid absorbable material (1) absorbed ethanol (reagent grade product of Wako Pure Chemical Industries, Ltd. having a purity of not less than 99.5%) at 25 ° C. in 15 seconds. The capacity for absorption was found to be 13.2 g/g. The liquid absorbable material (1) absorbed physiological saline solution (aqueous 0.9 wt % sodium chloride solution) at 25° C. in 20 seconds and the same physiological saline solution at 37° C. in 7 seconds. The capacity for absorption was found to be 17.5 g/g and the ratio of retention under load to be 91.6%. It absorbed olive oil (reagent grade olive oil produced by Wako Pure Chemical Industries, Ltd.) at 37° C. in 37 seconds. The capacity for absorption was found to be 18.3 g/g.

EXAMPLE 2

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then a solution containing 21.6 g of stearyl methacrylate, 4 g of trimethylol propane trimethacrylate, 2.4 g of methyl methacrylate, and 4.5 g of sorbitan monooleate (trademark designation "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer (I-2). This polymer was found to have an average pore diameter of 8μm. This polymer was washed with hot water at 50° C. and sliced in the hydrous state into pieces 10 mm in thickness. The piece was interposed between two perforated plates, compressed there between in the direction of thickness to be dewatered, and then dried in a hot air drier at 60° C. for 16 hours to obtain a liquid absorbable material (2) of this invention made of a porous formed article having a density of 0.31 g/cm³.

The liquid absorbable material (2) absorbed ethanol at 25° C. in 5 seconds. The capacity for absorption was found to be 13.0 g/g. The liquid absorbable material (2) absorbed physiological saline solution at 25° C. in 13 seconds and the same physiological saline solution at 37° C. in 5 seconds. The capacity for absorption was found to be 17.9 g/g and the ratio of retention under pressure to be 96.6%. It absorbed olive oil at 37° C. in 51 seconds. The capacity for absorption was found to be 18.5 g/g.

EXAMPLE 3

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 14.4 g of stearyl methacrylate, 2 g of trimethylol propane trimethacrylate, 1.6 g of methyl methacrylate, and 3 g of sorbitan monooleate (trademark designation "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 5 hours with the inner temperature of the vessel kept at 65° to 75° C., to obtain a hydrous porous cross-linked polymer (I-3). This polymer was found to have an average pore diameter of 4μm. This polymer was washed with hot water at 40° C. and sliced in the hydrous state into pieces 10 mm in thickness. The piece was interposed between two perforated plates, compressed there between in the direction of thickness to be dewatered, and then dried in a hot air drier at 60° C. for 16 hours to obtain a liquid absorbable material (3) of this invention made of a porous formed article having a density of 0.49 g/cm³.

The liquid absorbable material (3) absorbed ethanol at 25° C. in 5 seconds. The capacity for absorption was found to be 20.5 g/g. The liquid absorbable material (3) absorbed physiological saline solution at 25° C. in 31 seconds and the same physiological saline solution at 37° C. in 14 seconds. The capacity for absorption was found to be 27.2 g/g and the ratio of retention under load to be 43.6%. The liquid absorbable material (3) absorbed olive oil at 37° C. in 86 seconds. The capacity for absorption was found to be 30.3 g/g.

EXAMPLE 4

A cylindrical vessel having an inner volume of 1000 ml and made of polypropylene was charged as a water phase with 660 g of purified water having dissolved therein 1.0% by weight of calcium chloride and 0.15% by weight of potassium persulfate. Then, a solution containing 14.4 g of stearyl methacrylate, 6 g of trimethylol propane trimethacrylate, 1.6 g of methyl methacrylate, and 3.0 g of sorbitan monooleate (trademark designation "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer (I-4). This polymer was found to have an average pore diameter of 8μm. This polymer was washed with hot water at 40° C. and sliced in the hydrous state into pieces 10 mm in thickness. The piece was interposed between two perforated plates, compressed there between in the direction of thickness to be dewatered, and then dried in a hot air drier at 60° C. for 12 hours to obtain a liquid absorbable material (4) of this invention made of a porous formed article having a density of 0.32 g/cm³.

The liquid absorbable material (4) absorbed ethanol at 25° C. in 45 seconds. The capacity for absorption was found to be 13.5 g/g. The liquid absorbable material (4) absorbed physiological saline solution at 37° C. in 12 seconds. The capacity for absorption was found to be 17.8 g/g and the ratio of retention under load to be 92.7%. The liquid absorbable material (4) absorbed olive oil at 37° C. in 54 seconds. The capacity for absorption was found to be 16.8 g/g.

EXAMPLE 5

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 28.8 g of stearyl methacrylate, 4 g of trimethylol propane trimethacrylate, 3.2 g of methyl methacrylate, and 6 g of sorbitan monooleate (trademark designation "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer (I-5). This polymer was found to have an average pore diameter of 5μm. This polymer was washed with hot water at 80° C. and sliced in the hydrous state into pieces 10 mm in thickness. The piece was interposed between two perforated plates, compressed there between in the direction of thickness to be dewatered, and then dried in a hot air drier at 60° C. for 8 hours to obtain a liquid absorbable material (5) of this invention made of a porous formed article having a density of 0.47 g/cm³.

The liquid absorbable material (5) absorbed ethanol at 50° C. in 15 seconds. The capacity for absorption was found to be 11.8 g/g. The liquid absorbable material (5) absorbed physiological saline solution at 60° C. in 24 seconds. The capacity for absorption was found to be 13.9 g/g and the ratio of retention under load to be 100%. The liquid absorbable material (5) absorbed olive oil at 60C. in 58 seconds. The capacity for absorption was found to be 16.8 g/g.

EXAMPLE 6

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of stearyl methacrylate, 3 g of trimethylol propane trimethacrylate, 2.4 g of methyl methacrylate, and 4.5 g of sorbitan monooleate (trademark designation "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 10 hours with the inner temperature of the vessel kept at 65° to 75° C., to obtain a hydrous porous cross-linked polymer (I-6). This polymer was found to have an average pore diameter of 3 microns. This polymer was washed with hot water at 65° C. and sliced in the hydrous state into pieces 10 mm in thickness. The piece was interposed between two perforated plates, compressed there between in the direction of thickness to be dewatered, and then dried in a hot air drier at 60° C. for 6 hours to obtain a liquid absorbable material (6) of this invention made of a porous formed article having a density of 0.36 g/cm$^3$.

The liquid absorbable material (6) absorbed ethanol at 25° C. in 59 seconds. The capacity for absorption was found to be 15.6 g/g. The liquid absorbable material (6) absorbed physiological saline solution at 37° C. in 35 seconds. The capacity for absorption was found to be 16.9 g/g and the ratio of retention under load to be 84.0%. The liquid absorbable material (6) absorbed olive oil at 37° C. in 27 seconds. The capacity for absorption was found to be 17.8 g/g. This liquid absorbable material (6) absorbed toluene at 23° C. in one second and swelled with the absorbed toluene. The capacity for absorption was 24.8 g/g.

Control 1

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of stearyl methacrylate, 4 g of trimethylol propane trimethacrylate, 2.4 g of methyl methacrylate, 4.5 g of sorbitan monooleate (trademark designation "Span 80"), and 1.5 g of sorbitan trioleate (marketed under trademark designation "Span 85" and product of Kao Corp.) was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer (I-7). This polymer was found to have an average pore diameter of 40μm. This polymer was washed with cold water and sliced in the hydrous state into pieces 10 mm in thickness. The piece was interposed between two perforated plates, compressed there between in the direction of thickness to be dewatered, and then dried in a hot air drier at 60° C. for 3 hours to obtain a liquid absorbable material (1) for comparison made of a porous formed article having a density of 0.1 g/cm$^3$.

The liquid absorbable material (1) for comparison absorbed ethanol at 25° C. in 3 seconds. The capacity for absorption was found to be 8.5 g/g. The liquid absorbable material (1) for comparison absorbed only 6.8g of physiological saline solution per g at 37° C. even after 5 minutes.

EXAMPLE 7

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of lauryl acrylate, 3 g of styrene, 1 g of divinyl benzene (purity 55%), and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. This polymer was washed with water and sliced in the hydrous state into pieces 10 mm in thickness. The piece was inserted tightly between opposed perforated plates and compressed there between in the direction of thickness to be dewatered, to obtain a liquid absorbable material (7) of this invention made of a porous formed article wherein the partitioning walls in the cross-linked polymer exhibited a swelling degree of 4.0 to kerosene and the material itself possessed a density of 0.9 g/cm$^3$.

This liquid absorbable material (7) was cut to obtain a sample having the square of 1 cm as its surface area. This sample was tested for capacity for absorption per unit weight. It was found to swell by absorbing 8.0 g of water in 180 seconds, 4.6 g of ethanol in 10 seconds, 16.4 g of toluene in 5 seconds, and 13.3 g of kerosene in 22 seconds respectively per g.

EXAMPLE 8

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of lauryl acrylate, 3 g of styrene, 1 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 5 hours, with the inner temperature of the flask kept at 65° to 75° C., to obtain a hydrous cross-linked polymer. This polymer was sliced and washed with water and compressed between opposed perforated plates to be dewatered, to obtain a liquid absorbable material (8) of this invention made of a porous formed article wherein the partitioning walls in the cross-linked polymer exhibited a swelling degree of 4.2 to kerosene and the material itself possessed a density of 0.85 g/cm$^3$.

This liquid absorbable material (8) was tested for capacity for absorption per unit weight in the same manner as in Example 1. It was found to swell by absorbing 9.2 g of water in 25 seconds, 5.0 g of ethanol in 8 seconds, 19.3 g of toluene in 5 seconds, and 15.8 g of kerosene in 16 seconds respectively per g.

EXAMPLE 9

A cylindrical separable flask having an inner volume of 500 ml was charged as a water phase with 330 g of purified water having dissolved and dispersed therein 1% by weight of calcium chloride, 0.15% by weight of potassium persulfate, and 1 g of minute particles of silicon dioxide (marketed under trademark designation of "Aerosil 200"). Then, a solution containing 29 g of lauryl acrylate, 3 g of styrene, 1 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 20 hours, with the inner temperature of the flask kept at 65° to 75° C., to obtain a hydrous cross-linked polymer. This polymer was sliced and washed with water, compressed between opposed perforated plates to be dewatered, and dried at 60° C. for 2 hours, to obtain a liquid absorbable material (9) of this invention made of a porous formed article wherein the partitioning walls in the cross-linked polymer exhibited a swelling degree of 4.4 to kerosene and the material itself possessed a density of 0.92 g/cm$^3$.

This liquid absorbable material (9) was tested for capacity for absorption per unit weight in the same manner as in Example 1. It was found to swell by absorbing 7.3 g of water in 69 seconds, 4.5 g of ethanol in 13 seconds, 20.3 g of toluene in 5 seconds, and 15.7 g of kerosene in 30 seconds respectively per g. This liquid absorbable material (9) swelled by absorbing 10 cm$^3$ of salad oil per cm$^3$ in 5 minutes.

EXAMPLE 10

A cylindrical separable flask having an inner volume of 500 ml was charged as a water phase with 330 g of purified water having dissolved and dispersed therein 1% by weight of calcium chloride, 0.15% by weight of potassium persulfate, and 3 g of minute particles of silicon dioxide (marketed under trademark designation of "Siloid 63")Then, a solution containing 29 g of lauryl acrylate, 3 g of styrene, 1 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The resultant mixture was cast in a box-shaped vessel measuring 500 mm in length, 100 mm in width, and 20 mm in depth and made of polypropylene and polymerized therein at a temperature of 65° to 75° C. for 20 hours, to obtain a hydrous cross-linked polymer. This polymer was compressed and dewatered between opposed perforated plates and then dried at 60° C. for 20 hours, to obtain a liquid absorbable material (10) of this invention made of a porous sheet-like formed article wherein the partitioning walls in the cross-linked polymer exhibited a swelling degree of 4.6 to kerosene and the material itself possessed a density of 0.85 g/cm$^3$.

When this liquid absorbable material (10) was left immersed severally in water, ethanol, toluene, and kerosene for 24 hours, it swelled by absorbing 9.2 g of water, 7.2 g of ethanol, 21.7 g of toluene, and 16.9 g of kerosene per g.

Example 11

A cylindrical separable flask having an inner volume of 1000 ml was charged as a water phase with 660 g of purified water having dissolved therein 0.5% by weight of calcium chloride and 0.075% by weight of potassium persulfate. Then, a solution containing 29 g of a mixture of lauryl acrylate and tridecyl acrylate (produced by Osaka Organic Chemical Industry Co., Ltd. and marketed under trademark designation of "LTA"), 3 g of styrene, 1 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. This polymer was washed with water and sliced into pieces 10 mm in thickness. The piece was compressed between opposed perforated plates in the direction of thickness and dewatered, and dried under a reduced pressure at 60° C. for 20 hours, to obtain a liquid absorbable material (11) of this invention made of a porous formed article wherein the partitioning walls in the cross-linked polymer exhibited a swelling degree of 4.1 to kerosene and the material itself possessed a density of 0.68 g/cm$^3$.

The liquid absorbable material (11) was cut to obtain a sample having the square of about 1 cm as its surface area. When this sample was left standing severally in water, ethanol, toluene, and kerosene for 24 hours, it swelled by absorbing 15.3 g of water, 11.4 g of ethanol, 30.5 g of toluene, and 36.7 g of kerosene per g.

EXAMPLE 12

A cylindrical separable flask having an inner volume of 1000 ml was charged as a water phase with 660 g of purified water having dissolved and dispersed therein 0.5% by weight of calcium chloride and 0.075% by weight of potassium persulfate and further having dispersed therein 2 g of Aerosil 200. Then, a solution containing 29 g of a mixture of lauryl acrylate and tridecyl acrylate (produced by Osaka Organic Chemical Industry Co., Ltd. and marketed under trademark designation of "LTA"), 3 g of styrene, 1 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. This polymer was washed with water and sliced into pieces 10 mm in thickness. The piece was compressed between opposed perforated plates in the direction of thickness and dewatered to obtain a liquid absorbable material (12) of this invention made of a porous formed article wherein the partitioning walls in the cross-linked polymer exhibited a swelling degree of 3.6 to kerosene and the material itself possessed a density of 0.68 g/cm$^3$.

When this liquid absorbable material (12) was tested for capacity for absorption per unit weight in the same manner as in Example 7, it was found to swell by absorbing 15.3 g of water in 240 seconds, 12.5 g of ethanol in 30 seconds, 47.6 g of toluene in 20 seconds, and 47.5 g of kerosene in 25 seconds per g.

EXAMPLE 13

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of lauryl acrylate, 3 g of styrene, 0.6 g of divinyl benzene (purity 55%), 4.5 g of sorbitan monooleate (trademark designation "Span 80"), and 1.5 g of sorbitan trioleate (trademark designation "Span 85") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 5 hours, with the inner temperature of the flask kept at 65° to 75° C., to obtain a hydrous cross-linked polymer. This polymer was sliced, washed with water, and then compressed and dewatered between opposed perforated plates to obtain a liquid absorbable material (13) of this invention made of a porous formed article wherein the partitioning walls in the cross-linked polymer exhibited a swelling degree of 5.6 to kerosene and the material itself possessed a density of 0.95 g/cm$^3$.

When this liquid absorbable material (13) was tested for capacity for absorption per unit weight in the same manner as in Example 7, it was found to swell by absorbing 10.0 g of water in 282 seconds, 4.2 g of ethanol in 154 seconds, 9.7 g of toluene in 37 seconds, and 7.1 g of kerosene in 63 seconds per g.

EXAMPLE 14

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g lauryl acrylate, 3 g of methyl methacrylate, 1 g of divinyl benzene (purity 55%), and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 3 hours, with the inner temperature of the flask kept at 65° to 75° C., to obtain a hydrous cross-linked polymer. This polymer was washed with water and sliced in the hydrous state into pieces 10 mm in thickness. The piece was compressed between opposed perforated plates in the direction of thickness to be dewatered, to obtain a liquid absorbable material (14) of this invention made of a porous formed article wherein the partitioning walls in the cross-linked polymer exhibited a swelling degree of 5.5 to kerosene and the material itself possessed a density of 0.85 g/cm$^3$.

When this liquid absorbable material (14) was tested for capacity for absorption per unit weight in the same manner as in Example 7, it was found to swell by absorbing 7.6 g of water in 210 seconds, 4.9 g of ethanol in 30 seconds, 17.2 g of toluene in 30 seconds, and 15.6 g of kerosene in 90 seconds per unit weight.

EXAMPLE 15

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of lauryl acrylate, 3 g of methyl methacrylate, 1 g of 1,6-hexane diol dimethacrylate, and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 3 hours, with the inner temperature of the flask kept at 65° to 75° C., to obtain a hydrous cross-linked polymer. This polymer was washed with water and sliced in the hydrous state into pieces 10 mm in thickness. The piece was compressed between opposed perforated plates in the direction of thickness to be dewatered, to obtain a liquid absorbable material (15) of this invention made of a porous formed article wherein the partitioning walls in the cross-linked polymer exhibited a swelling degree of 5.6 to kerosene and the material itself possessed a density of 0.79 g/cm$^3$.

When this liquid absorbable material (15) was tested for capacity for absorption per unit weight in the same manner as in Example 7, it was found to swell by absorbing 7.6 g of water in 200 seconds, 5.0 g of ethanol in 30 seconds, 16.2 g of toluene in 90 seconds, and 22.1 g of kerosene in 100 seconds per unit weight.

Control 2

A cylindrical separable flask having an inner volume of 500 ml was charged as a water-phase with 330 g of purified water having dissolved therein 1% by weight of calcium chloride and 0.15% by weight of potassium persulfate. Then, a solution containing 32 g styrene, 1 g of divinyl benzene (purity 55%), and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. Since this polymer was incapable of being compressed or dewatered, it was washed with water and sliced into pieces 10 mm in thickness, then the piece was dried under a reduced pressure at 60° C. for 20 hours, to obtain a liquid absorbable material (2) for comparison made of a porous formed article wherein the partitioning walls in the cross-linked polymer exhibited a swelling degree of 1.6 to kerosene and the material itself possessed a density of 0.11 g/cm$^3$.

When this liquid absorbable material (2) for comparison was tested for capacity for absorption per unit weight in the same manner as in Example 7, it was found to absorb none of water, ethanol, and kerosene but to swell by absorbing 4.2 cm$^3$ of toluene per cm$^3$ in 30 seconds.

Control 3

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of 2-ethylhexyl acrylate, 3 g of styrene, 3 g of divinyl benzene (purity 55%), and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. This polymer was washed with water and sliced into pieces 10 mm in thickness. The piece was dried at 60° C., to obtain a liquid absorbable material (3) for comparison made of a porous formed article wherein the partitioning walls in the cross-linked polymer exhibited a swelling degree of 2.6 to kerosene and the material itself possessed a density of 0.1 g/cm$^3$.

When this liquid absorbable material (3) for comparison was tested for capacity for absorption per unit volume, it was found to swell by absorbing 1.8 cm$^3$ of water in 24 hours, 1.8 cm$^3$ of ethanol in 24 hours, 3.5 cm$^3$ of toluene in 10 seconds, and 2.8 cm$^3$ of kerosene in 5 seconds per cm$^3$.

Control 4

A cylindrical separable flask having an inner volume of 500 ml was charged as a water phase with 330 g of purified water having dissolved therein 1% by weight of calcium chloride and 0.15% by weight of potassium persulfate. Then, a solution containing 29 g of lauryl methacrylate, 3 g of styrene, 1 g of divinyl benzene (purity 55%), and 6 g of sorbitan monooleate (trademark designation "Span 80") was added as an oil phase to the flask keeping the water phase in a stirred state. The two phases were continuously stirred until the polymerization system assumed a constitution resembling yogurt. The stirring was discontinued after the polymerization system had assumed the yogurt-like constitution. The polymerization was effected for 10 hours, with the inner temperature of the flask kept at 65° to 75° C., to obtain a hydrous cross-linked polymer. This polymer was washed with water and sliced into pieces 10 mm in thickness. The piece was dried at room temperature, to obtain a liquid absorbable material (4) for comparison made of a porous formed article wherein the partitioning walls in the cross-linked polymer exhibited a swelling degree of 4.6 to kerosene and the material itself possessed a density of 0.13 g/cm$^3$.

When this liquid absorbable material (4) for comparison was tested for capacity for absorption per unit volume, it was found to swell by absorbing 1.0 cm$^3$ of water in 24 hours, 0.9 cm$^3$ of ethanol in 24 hours, 3.9 cm$^3$ of toluene in 24 hours, and 3.0cm$^3$ of kerosene in 24 hours per cm$^3$.

EXAMPLE 16

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of cetyl methacrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 3μm. This polymer was washed with hot water at 75° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (16) of this invention made of a porous formed article having a density of 0.33 g/cm$^3$.

The liquid absorbable material (16) absorbed ethanol at 25° C. in 4 seconds. The capacity for absorption was found to be 15.2 g/g. The liquid absorbable material (16) absorbed water at 25° C. in 21 seconds and water at 80° C. in 4 seconds. The capacity for absorption was found to be 19.7 g/g and the ratio of retention under load to be 98.2%. and the degree of swelling exhibited to kerosene was found to be 2.4.

EXAMPLE 17

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of myristyl methacrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 4μm. This polymer was washed with hot water at 75° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (17) of this invention made of a porous formed article having a density of 0.31 g/cm$^3$.

The liquid absorbable material (17) absorbed ethanol at 25° C. in 3 seconds. The capacity for absorption was found to be 16.7 g/g. The liquid absorbable material (1) absorbed water at 25° C. in 10 seconds and water at 80° C. in 1 second. The capacity for absorption was found to be 18.4 g/g and the ratio of retention under load to be 98.1% and the degree of swelling exhibited to kerosene was found to be 2.3.

EXAMPLE 18

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of lauryl methacrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porouscross-linked polymer. This polymer was found to have an average pore diameter of 4μm. This polymer was washed with hot water at 60° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (18) of this invention made of a porous formed article having a density of 0.47 g/cm$^3$.

The liquid absorbable material (18) absorbed ethanol at 25° C. in 5 seconds. The capacity for absorption was found to be 19.7 g/g. The liquid absorbable material (18) absorbed water at 80° C. in 35 seconds. The capacity for absorption was found to be 15.4 g/g and the ratio of retention under load to be 91.2% and the degree of swelling exhibited to kerosene was found to be 2.2.

EXAMPLE 19

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution comprising 21.6 g of stearyl acrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 3μm. This polymer was washed with hot water at 60° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (19) of this invention made of a porous formed article having a density of 0.45 g/cm$^3$.

The liquid absorbable material (19) absorbed water at 80° C. in 2 seconds. The capacity for absorption was found to be 20.4 g/g and the ratio of retention under load to be 95.3% and the degree of swelling exhibited to kerosene was found to be 2.1.

EXAMPLE 20

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of cetyl acrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 4μm. This polymer was washed with hot water at 60° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (20) of this invention made of a porous formed article having a density of 0.35 g/cm$^3$.

The liquid absorbable material (20) absorbed water at 80° C. in 3 seconds. The capacity for absorption was found to be 20.2 g/g and the ratio of retention under load to be 69.8% and the degree of swelling exhibited to kerosene was found to be 2.0.

EXAMPLE 21

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of myristyl methacrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 3μm. This polymer was washed with hot water at 60° C. and sliced in the hydrous state into pieces 10 mm in thickness. The piece was interposed between two opposed perforated plates, compressed there between in the direction of thickness to be dewatered, and then dried in a hot air drier at 60° C. for 16 hours to obtain a liquid absorbable material (21) of this invention made of a porous formed article having a density of 0.43 g/cm$^3$.

The liquid absorbable material (21) absorbed ethanol at 25° C. in 16 seconds. The capacity for absorption was found to be 16.7 g/g. This liquid absorbable material (21) absorbed water at 80° C. in 2 seconds. The capacity for absorption was found to be 21.6 g/g and the ratio of retention under load to be 66.7% and the degree of swelling exhibited to kerosene was found to be 2.2.

EXAMPLE 22

A cylindrical vessel having an inner volume of 1000 ml and made of polypropylene was charged as a water phase with 660 g of purified water having dissolved therein 0.5% by weight of calcium chloride and 0.075% by weight of potassium persulfate. Then, a solution containing 21.6 g of lauryl acrylate, 4 g of trimethylol propane trimethacrylate, 2.4 g of methyl methacrylate, and 4.5 g of sorbitan monooleate (marketed under trademark designation of "Span 80") was added as an oil phase to the vessel keeping the water phase in a stirred state. The two phases in the vessel were continuously stirred until the polymerization system assumed a constitution resembling yogurt. The stirring was discontinued after the polymerization system had assumed the yogurt-like constitution. The polymerization was effected for 3 hours with the inner temperature of the vessel kept at 65° to 75° C., to obtain a hydrous porous cross-linked polymer. This polymer was found to have an average pore diameter of 3μm. This polymer was washed with hot water at 60° C. and sliced in the hydrous state into pieces 10 mm in thickness. The piece was interposed between two opposed perforated plates, compressed therebetween in the direction of thickness to be dewatered, and then dried in a hot air drier at 60° C. for 16 hours to obtain a liquid absorbable material (22) of this invention made of a porous formed article having a density of 0.49 g/cm$^3$.

The liquid absorbable material (22) absorbed ethanol at 25° C. in 5 seconds. The capacity for absorption was found to be 16.8 g/g. This liquid absorbable material (22) absorbed water at 25° C. in 35 seconds and water at 80° C. in 3 seconds. The capacity for absorption was found to be 20.2 g/g and the ratio of retention under load to be 62.9% and the degree of swelling exhibited to kerosene was found to be 2.4.

Table 1 shows data of capacity per unit weight for absorbing water, ethanol, toluene, and kerosine respectively, data of capacity per unit volume, the glass transition point and swelling degree of the partitioning wall to kerosine with respect to the obtained liquid absorbable materials (1) to (22) and comparative absorbable material (1) to (4).

fibers, granules, a block, or a sheet without a sacrifice of its own outstanding speed of liquid absorption.

The liquid absorbable material of this invention, therefore, can be used not merely as oil absorbable agents for disposing of spent frying oil, fencing off drifting oil on coastal seawater, and disposing of spent shop oil. It can be used as both oleic and aqueous liquid absorbable agents in numerous fields for toys and cosmetic articles, sanitary and medical goods such as cleaning utensils, napkins, disposable diapers, and blood absorbents, food preserving goods such as freshness retainers, water retainers, moisture retainers, and drip absorbing sheets for vegetables, and household sundry goods such as aromatic agents and wipers, for example. The liquid absorbable material of this invention can be further used as components for such various absorbent goods as enumerated above.

We claim:

1. A liquid absorbable material comprising a porous compression formed article comprising partitioning walls of a cross-linked polymer and continuous micropores, said material having a density in the range of 0.2 to 1.0 g/cm$^3$, said partitioning walls exhibiting a swelling degree to kerosine in the range of 2 to 10, and said material having an absorption capacity per unit volume of at least 4 cm$^3$/cm$^3$ for water, ethanol, toluene and kerosine, respectively.

TABLE 1

|  | Tg (°C.) | Swelling degree of partition wall | Absorption Capacity per unit volume (cm3/cm3) | | | | Absorption Capacity per unit weight (g/g) | | | |
| --- | --- | --- | --- | --- | --- | --- | --- | --- | --- | --- |
|  |  |  | Water | Toluene | Kerosine | EtOH | Water | Toluene | Kerosine | EtOH |
| Liquid absorbable material 1 | 5 | 2.5 | 6.8 | 5.9 | 6.0 | 6.5 | 17.5 | 13.4 | 12.1 | 13.2 |
| Liquid absorbable material 2 | 10 | 2.4 | 5.5 | 4.5 | 4.4 | 5.1 | 17.9 | 12.8 | 11.1 | 13.0 |
| Liquid absorbable material 3 | 9 | 2.6 | 13.3 | 22.6 | 21.0 | 12.7 | 27.2 | 40.6 | 33.8 | 20.5 |
| Liquid absorbable material 4 | 11 | 2.2 | 5.7 | 5.3 | 5.9 | 5.5 | 17.8 | 13.0 | 13.3 | 13.5 |
| Liquid absorbable material 5 | 10 | 2.3 | 6.5 | 5.1 | 4.8 | 7.0 | 13.9 | 12.1 | 11.7 | 11.8 |
| Liquid absorbable material 6 | 10 | 2.5 | 6.9 | 7.9 | 7.7 | 7.1 | 16.9 | 24.8 | 19.5 | 15.6 |
| Liquid absorbable material 7 | −20 | 4.0 | 7.2 | 17.0 | 15.0 | 5.2 | 8.0 | 16.4 | 13.3 | 4.6 |
| Liquid absorbable material 8 | −22 | 4.2 | 7.8 | 18.9 | 16.8 | 5.9 | 9.2 | 19.3 | 15.8 | 5.0 |
| Liquid absorbable material 9 | −21 | 4.4 | 6.7 | 21.6 | 18.0 | 5.2 | 7.3 | 20.3 | 15.7 | 4.5 |
| Liquid absorbable material 10 | −20 | 4.6 | 7.8 | 21.3 | 18.2 | 7.8 | 9.2 | 21.7 | 16.9 | 7.2 |
| Liquid absorbable material 11 | −20 | 4.1 | 10.4 | 23.8 | 31.6 | 9.9 | 15.3 | 30.5 | 36.7 | 11.4 |
| Liquid absorbable material 12 | −20 | 3.6 | 10.4 | 36.7 | 40.9 | 10.8 | 15.3 | 47.6 | 47.5 | 12.5 |
| Liquid absorbable material 13 | −23 | 5.6 | 6.5 | 10.4 | 8.5 | 5.1 | 10.0 | 9.7 | 7.1 | 4.2 |
| Liquid absorbable material 14 | −22 | 5.5 | 6.5 | 16.6 | 16.8 | 5.3 | 7.6 | 17.2 | 15.6 | 4.9 |
| Liquid absorbable material 15 | −21 | 5.6 | 6.0 | 14.5 | 22.1 | 5.0 | 7.6 | 16.2 | 22.1 | 5.0 |
| Liquid absorbable material 16 | −4 | 2.4 | 6.5 | 8.8 | 8.7 | 5.4 | 19.7 | 23.5 | 20.9 | 15.2 |
| Liquid absorbable material 17 | 25 | 2.3 | 5.7 | 8.4 | 7.4 | 5.6 | 18.4 | 24.0 | 18.8 | 16.7 |
| Liquid absorbable material 18 | 25 | 2.2 | 7.2 | 11.5 | 11.2 | 11.7 | 15.4 | 21.6 | 18.8 | 19.7 |
| Liquid absorbable material 19 | 36 | 2.1 | 9.2 | 14.4 | 12.2 | 8.7 | 20.4 | 28.3 | 21.5 | 20.2 |
| Liquid absorbable material 20 | 35 | 2.0 | 7.1 | 10.7 | 10.0 | 7.1 | 20.2 | 27.1 | 22.5 | 19.8 |
| Liquid absorbable material 21 | 14.6 | 2.2 | 9.2 | 12.8 | 12.2 | 9.1 | 21.6 | 26.4 | 22.5 | 16.7 |
| Liquid absorbable material 22 | −7 | 2.4 | 9.9 | 15.4 | 14.1 | 10.4 | 20.2 | 27.8 | 22.5 | 16.8 |
| Comparative Liquid absorbable material 1 | 10 | 2.2 | 0.8 | — | — | 1.1 | 6.8 | — | — | 8.5 |
| Comparative Liquid absorbable material 2 | 105 | 1.6 | — | 4.2 | — | — | — | — | — | — |
| Comparative Liquid absorbable material 3 | −25 | 2.6 | 1.8 | 3.5 | 2.8 | 1.8 | — | — | — | — |
| Comparative Liquid absorbable material 4 | 25 | 4.6 | 1.0 | 3.9 | 3.0 | 0.9 | — | — | — | — |

Industrial Applicability

By this invention, a compact liquid absorbable material which is easy to handle and is capable of quickly absorbing a large volume of such a liquid substance as water, alcohol, or petroleum and expanding with the absorbed liquid substance is obtained. The liquid absorbable material of this invention can be freely molded in a varying form such as 2. A liquid absorbable material comprising a porous compression formed article comprising partitioning walls of a cross-linked polymer and continuous micropores, said material having a density in the range of 0.2 to 1.0 g/cm$^3$, and said material having an absorption capacity per unit weight of at least 10 g/g for water, ethanol, toluene and kerosine, respectively, when the liquids are at a temperature not less than the softening point of the cross-linked polymer.

3. A liquid absorbable material according to claim 1 or 2, wherein said cross-linked polymer has a glass transition temperature in the range of $-30°$ to $90\ °C$.

4. A liquid absorbable material according to claim 1 or 2, wherein said liquid absorbing material has a density in the range of 0.3 to 0.98 g/cm$^3$.

5. A liquid absorbable material according to claim 1 or 2, wherein said material has a volume of at least 0.2 cm$^3$.

6. A liquid absorbable material according to claim 1 or 2, wherein said material exhibits a ratio of retention of not less than 30% under pressure to physiological saline solution.

* * * * *